(12) United States Patent
Chou et al.

(10) Patent No.: US 11,567,531 B2
(45) Date of Patent: Jan. 31, 2023

(54) FINGERPRINT SENSOR COMPATIBLE SCREEN PROTECTOR

(71) Applicant: Superior Communications, Inc., Irwindale, CA (US)

(72) Inventors: Vivian Wei-Fen Chou, Diamond Bar, CA (US); Eugene Chun, Brea, CA (US)

(73) Assignee: Superior Communications, Inc., Irwindale, CA (US)

( * ) Notice: Subject to any disclaimer, the term of this patent is extended or adjusted under 35 U.S.C. 154(b) by 190 days.

(21) Appl. No.: 16/843,859

(22) Filed: Apr. 8, 2020

(65) Prior Publication Data

US 2020/0321995 A1 Oct. 8, 2020

Related U.S. Application Data

(60) Provisional application No. 62/831,079, filed on Apr. 8, 2019.

(51) Int. Cl.
| | | |
|---|---|---|
| *G06F 1/16* | (2006.01) | |
| *H04B 1/3888* | (2015.01) | |
| *H04M 1/02* | (2006.01) | |
| *G06V 40/13* | (2022.01) | |

(52) U.S. Cl.
CPC .............. *G06F 1/16* (2013.01); *G06F 1/1601* (2013.01); *G06V 40/1306* (2022.01); *H04B 1/3888* (2013.01); *H04M 1/0266* (2013.01)

(58) Field of Classification Search
CPC ............. H04B 1/3888; G06V 40/1306; H04M 1/0266
See application file for complete search history.

(56) References Cited

U.S. PATENT DOCUMENTS

| | | | |
|---|---|---|---|
| 2017/0217143 A1* | 8/2017 | Kim | B32B 27/38 |
| 2020/0234029 A1* | 7/2020 | Fukunaga | G06V 40/1329 |

* cited by examiner

*Primary Examiner* — Mukundbhai G Patel
(74) *Attorney, Agent, or Firm* — Snell & Wilmer LLP

(57) ABSTRACT

Systems, devices, and methods that ensures that an ultrasonic fingerprint detection process is not interfered with by using a screen protector. An example screen protector for a mobile device is disclosed that is capable of an in-screen fingerprint detection. The screen protector includes a first layer made of a clear rigid material and configured to be touched by a user. The screen protector also includes a second layer beneath the first layer and made of a film. Additionally, the screen protector includes a third layer beneath the second layer and configured to contact the mobile device. The third layer includes a fingerprint conduit configured to facilitate the in-screen fingerprint detection.

18 Claims, 6 Drawing Sheets

… (1)

FINGERPRINT SENSOR COMPATIBLE SCREEN PROTECTOR

CROSS-REFERENCE TO RELATED APPLICATIONS

This application claims priority to and the benefits of U.S. Provisional Patent Application No. 62/831,079 filed on Apr. 8, 2019 and entitled "FINGERPRINT SENSOR COMPATIBLE SCREEN PROTECTOR," the entirety of which, including any appendices, is incorporated herein by reference for all purposes.

TECHNICAL FIELD

The present disclosure relates to an apparatus and/or system for protecting a screen of a mobile device.

BACKGROUND

Mobile devices such as smartphones and tablet computers are used by many individuals, and screen protectors are used by many mobile device users to protect the display screen of the mobile device. For example, screen protectors may help keep screens from being cracked when a mobile device is dropped, an item is dropped on the mobile device, for example. Some mobile devices have fingerprint sensors that are embedded into the display screen. The fingerprint sensor may be used to identify a user and allow access to the mobile device. Conventional screen protectors may not be compatible with these mobile devices. Thus, there is a need for an improved screen protector.

SUMMARY

In various embodiments, a screen protector for a mobile device capable of an in-screen fingerprint detection. Conventional screen protectors may not be compatible with mobile devices because conventional screen protectors have an air gap between the mobile device screen and the screen protector that causes interference, others use materials that are not sufficiently transparent to accurately emit and detect sound waves, and others are simply too thick to reliably perform the ultrasonic fingerprint detection. The screen protector described herein ensures that the ultrasonic or optical fingerprint detection process is not interfered with by using a first layer made of a clear rigid material, a second layer beneath the first layer and made of a film, and a third layer beneath the second layer and configured to contact the mobile device. The third layer includes a fingerprint conduit configured to facilitate the in-screen fingerprint detection.

In an embodiment, a screen protector for a mobile device capable of an in-screen fingerprint detection includes a first layer made of a clear rigid material and configured to be touched by a user. The screen protector also includes a second layer beneath the first layer and made of a film. Additionally, the screen protector includes a third layer beneath the second layer and configured to contact the mobile device. The third layer includes a fingerprint conduit configured to facilitate the in-screen fingerprint detection.

In an embodiment, a mobile device system capable of an in-screen fingerprint detection includes a mobile device having a screen. The screen has a fingerprint detection region. The mobile device system also includes a screen protector. The screen protector includes a first layer made of a clear rigid material and configured to be touched by a user. The screen protector also includes a second layer beneath the first layer and made of a film. Additionally, the screen protector includes a third layer beneath the second layer and configured to contact the mobile device. The third layer including a fingerprint conduit configured to facilitate the in-screen fingerprint detection.

In an embodiment, a method of making a screen protector for a mobile device capable of an in-screen fingerprint detection includes manufacturing a first layer made of a clear rigid material and configured to be touched by a user. The method includes manufacturing a second layer made of a film. The method also includes manufacturing a third layer configured to contact the mobile device. The third layer including a fingerprint conduit configured to facilitate the in-screen fingerprint detection. Additionally, the method includes locating the first layer, the second layer, and the third layer in order, the second layer beneath the first layer, the third layer beneath the second layer.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, apparatuses, and methods for protecting a display screen of a mobile device. Some mobile devices have fingerprint sensors embedded into the display of the mobile device. These embedded fingerprint sensors may be an ultrasonic fingerprint sensor which emits sound waves that are reflected off of the user's finger and back to a sensor which is capable of detecting fingerprint data based on the reflected sound waves.

Conventional screen protectors are not compatible with these mobile devices, as the conventional screen protectors interfere with the process of detecting fingerprints ultrasonically. Some conventional screen protectors have an air gap between the mobile device screen and the screen protector that causes interference, others use materials that are not sufficiently transparent to accurately emit and detect sound waves, and others are simply too thick to reliably perform the ultrasonic fingerprint detection. The screen protector described herein ensures that the ultrasonic fingerprint detection process is not interfered with.

Figure 1:
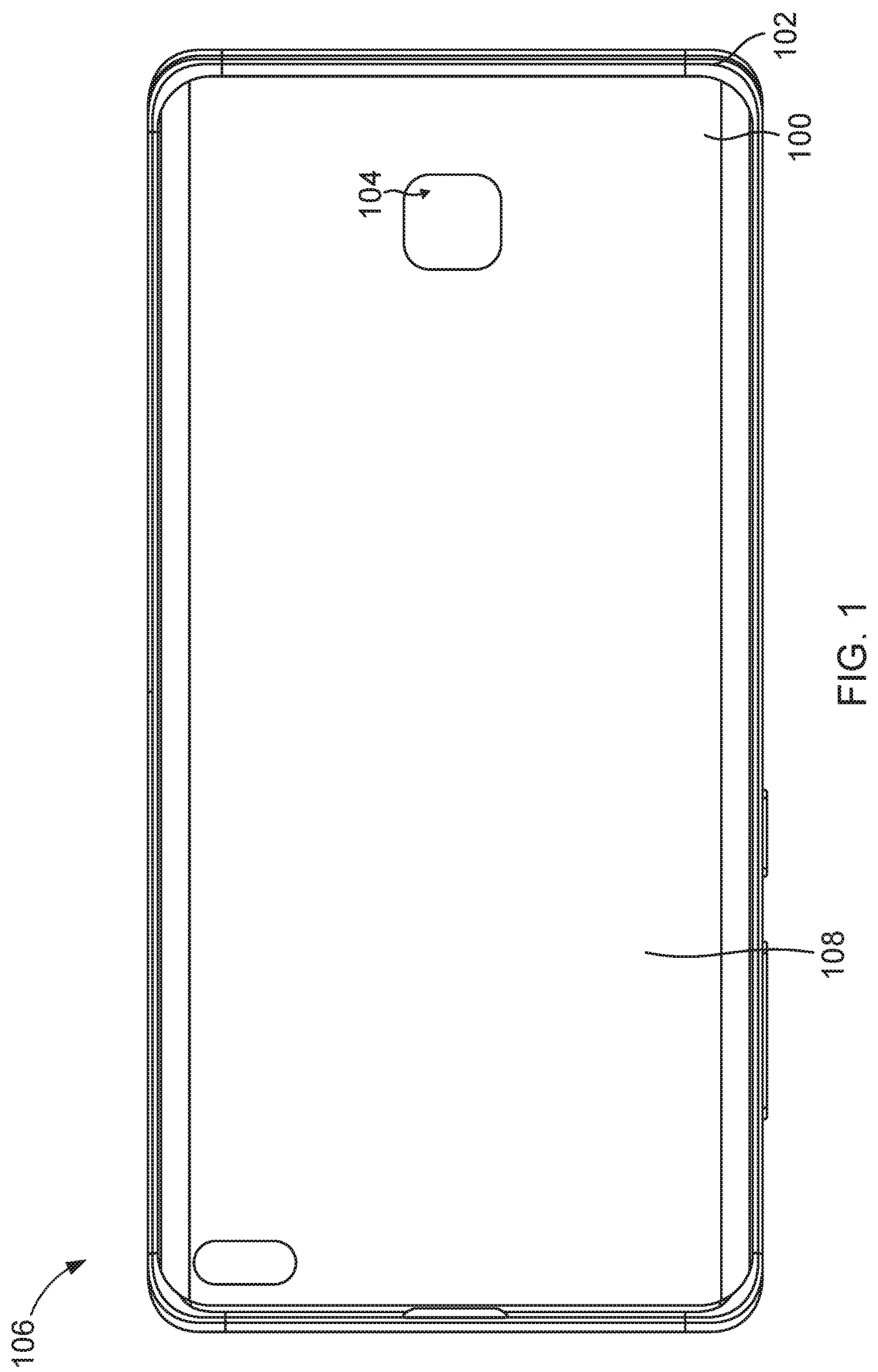
FIG. 1 is a diagram that illustrates a front view of the screen protector and mobile device, according to various embodiments of the invention.

FIG. 1 illustrates a front view of a screen protector 100 and a mobile device 102, according to various embodiments of the invention. The mobile device 102 has a fingerprint reading region 104 where the user locates the user's finger for detection.

The screen protector 100 and the mobile device 102 may form a mobile device system 106. The mobile device system 106 may be capable of an in-screen fingerprint detection. The mobile device system 106 may include the mobile device 102. The mobile device 102 may have a screen 108. The screen 108 may have the fingerprint reading region 104.

The mobile device system 106 may include the screen protector 100. The screen protector 100 may include a first layer made of a clear rigid material and configured to be touched by a user, a second layer beneath the first layer and made of a film, and a third layer beneath the second layer and configured to contact the mobile device, the third layer including a fingerprint conduit configured to facilitate the in-screen fingerprint detection, as discussed in more detail with respect to FIGS. 3-5.

The multi-layer screen protector may eliminate an air gap between the mobile device screen and the screen protector that causes interference. Furthermore, the multi-layer screen protector may use materials that are sufficiently transparent to sound waves to accurately emit and detect sound waves. Furthermore, the multi-layer screen protector may be thin enough to reliably perform the ultrasonic fingerprint detection. Accordingly, the screen protector described herein may ensures that the ultrasonic fingerprint detection process is not interfered with.

Figure 2:
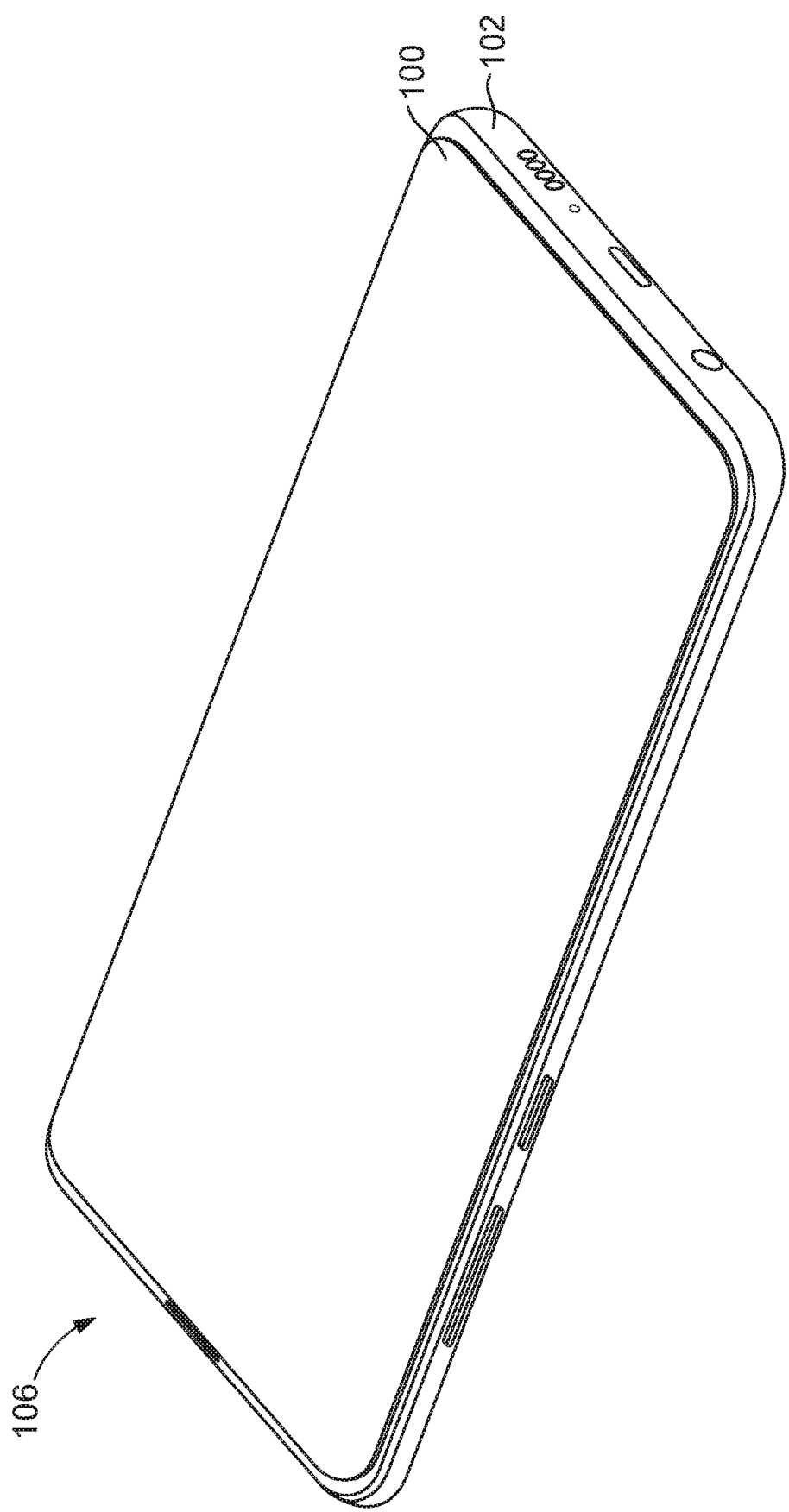
FIG. 2 is a diagram that illustrates a perspective view of the screen protector and mobile device, according to various embodiments of the invention.

FIG. 2 illustrates a perspective view of the screen protector 100 and mobile device 102, according to various embodiments of the invention. The screen protector 100 provides coverage for the screen of the mobile device 102. As discussed with respect to FIG. 1, the screen protector 100 may include three layers and be configured to ensure that the ultrasonic fingerprint detection process is not interfered with.

As discussed above, conventional screen protectors may not be compatible with mobile devices having fingerprint detectors because conventional screen protectors interfere with the process of detecting fingerprints, e.g., ultrasonically. Some conventional screen protectors have an air gap between the mobile device screen and the screen protector that causes interference, others use materials that are not sufficiently transparent to accurately emit and detect sound waves, and others are simply too thick to reliably perform the ultrasonic fingerprint detection. Accordingly, the screen protector described herein may ensure that the ultrasonic, or other fingerprint detection process is not interfered with by eliminating or minimizing any air gap between the mobile device screen and the screen protector that causes interference, using materials that are sufficiently transparent to accurately emit and detect sound waves (or other signals) used for fingerprint detection, using materials that are not too thick to reliably perform the ultrasonic or other fingerprint detection, or some combination of one or more of eliminating or minimizing any air gap between the mobile device screen and the screen protector that causes interference, using materials that are sufficiently transparent to accurately emit and detect sound waves (or other signals) used for fingerprint detection, and using materials that are not too thick to reliably perform the ultrasonic or other fingerprint detection.

Figure 3:
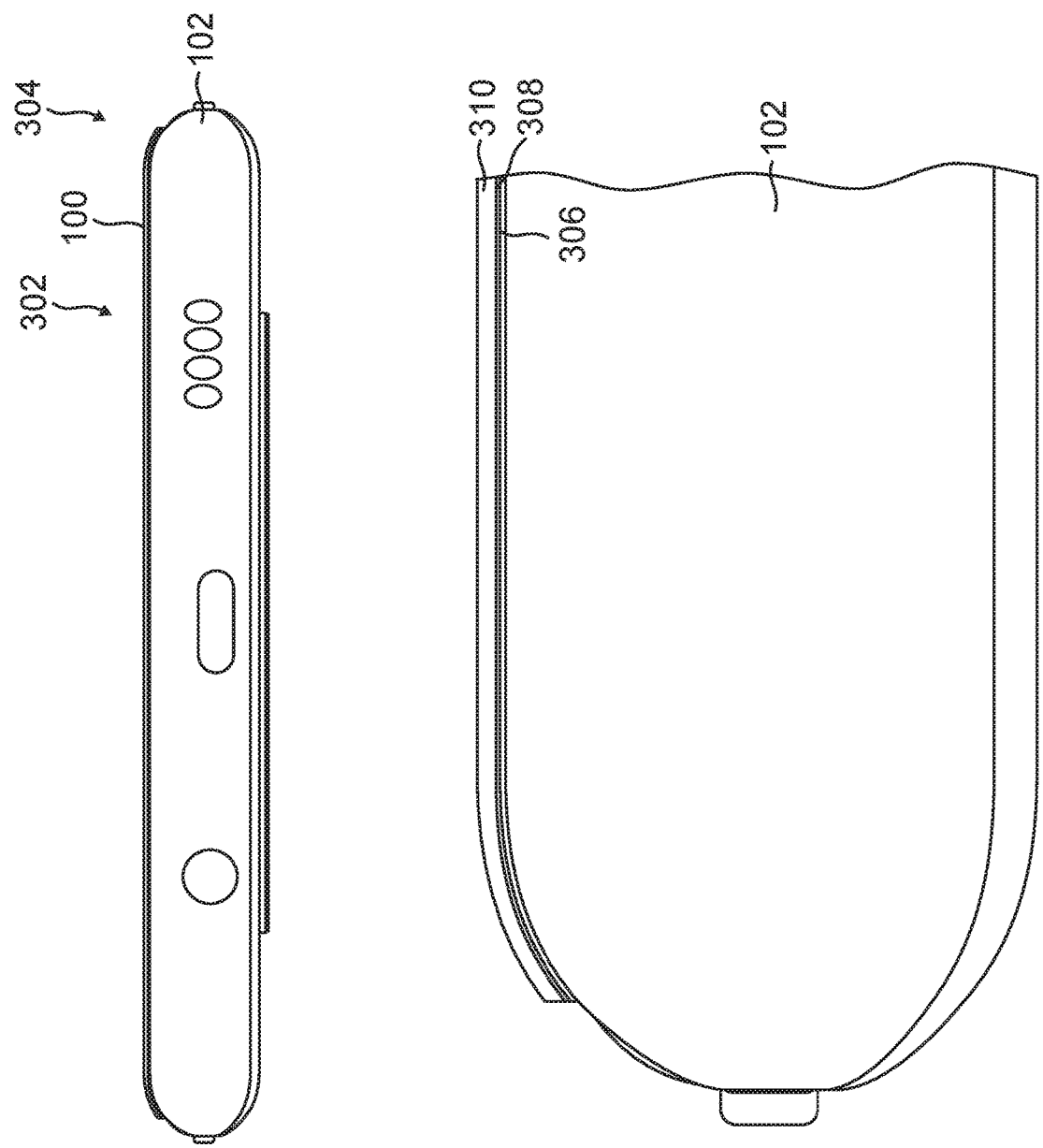
FIG. 3 is a diagram that illustrates a bottom view of the screen protector and mobile device, according to various embodiments of the invention.

FIG. 3 illustrates a bottom view of the screen protector 100 and mobile device 102, according to various embodiments of the invention. The screen protector 100 may include a flat portion 302 and a curved portion 304 at the sides to accommodate for the curved shape of the screen of the mobile device 102. The screen protector 100 also includes three layers: a top layer 310, a middle layer 308, and a bottom layer 306. The top layer 310 may be farthest away from the screen of the mobile device 102 (e.g., the top layer may be exposed to the environment and touched by the user) and the bottom layer 306 may be closest to the screen of the mobile device 102.

Figure 4:
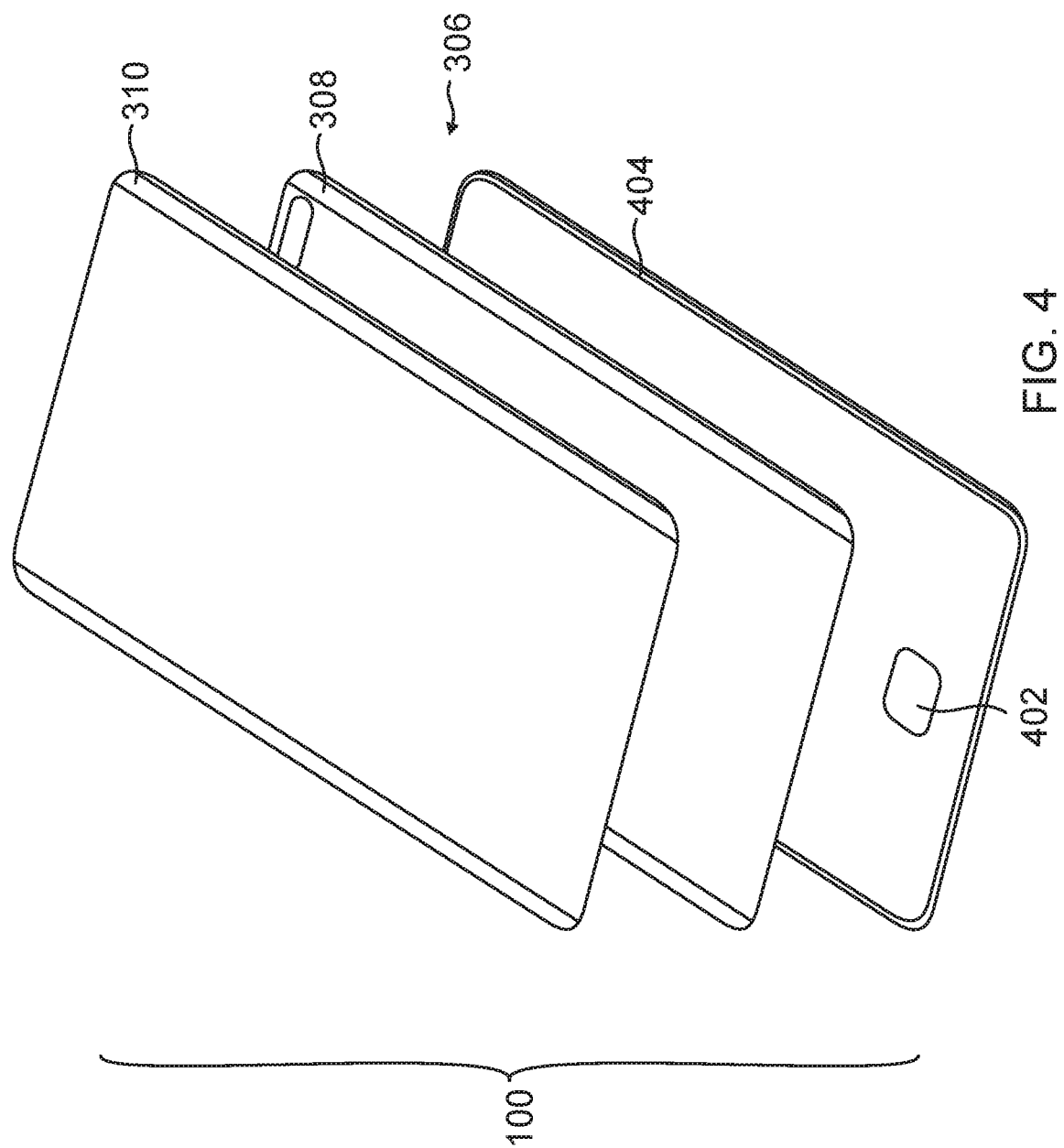
FIG. 4 is a diagram that illustrates an exploded view of the screen protector, according to various embodiments of the invention.

FIG. 4 illustrates an exploded view of the screen protector, according to various embodiments of the invention. More specifically, FIG. 4 illustrates the three layers 306-310 of the screen protector 100, e.g., first layer (top layer 310), second layer (middle layer 308), and third layer (bottom layer 306).

The bottom layer 306 includes a perimeter portion 404 and a fingerprint conduit 402. There may not be any material between the perimeter portion 404 and the fingerprint conduit 402. The perimeter portion 404 connects the middle layer 308 to the screen of the mobile device 102 along a perimeter of the screen of the mobile device 102. The fingerprint conduit 402 may be aligned with the fingerprint reading region 104 of the mobile device 102.

As discussed above, the screen protector 100 may include three layers 306-310, e.g., first layer (top layer 310), second layer (middle layer 308), and third layer (bottom layer 306). The top layer 310 may be made of a clear rigid material. The clear rigid material may be clear plastic, clear rigid acrylic sheets, clear rigid vinyl, glass, or other clear rigid material. Additionally, the top layer 310 may be configured to be touched by a user.

In the example, the screen protector 100 may include the middle layer 308. The middle layer 308 may be beneath the top layer 310. The middle layer 308 may be made of a film. For example, the middle layer 308 may be made of a film formed by chemical deposition, physical deposition, such as mechanical, electromechanical or thermodynamic means to produce a thin film, or other method of forming a film.

In the example, the screen protector 100 may include the bottom layer 306 beneath the middle layer 308 and configured to contact the mobile device 102, the bottom layer 306 may include a fingerprint conduit 402 configured to facilitate the in-screen fingerprint detection.

Figure 5:
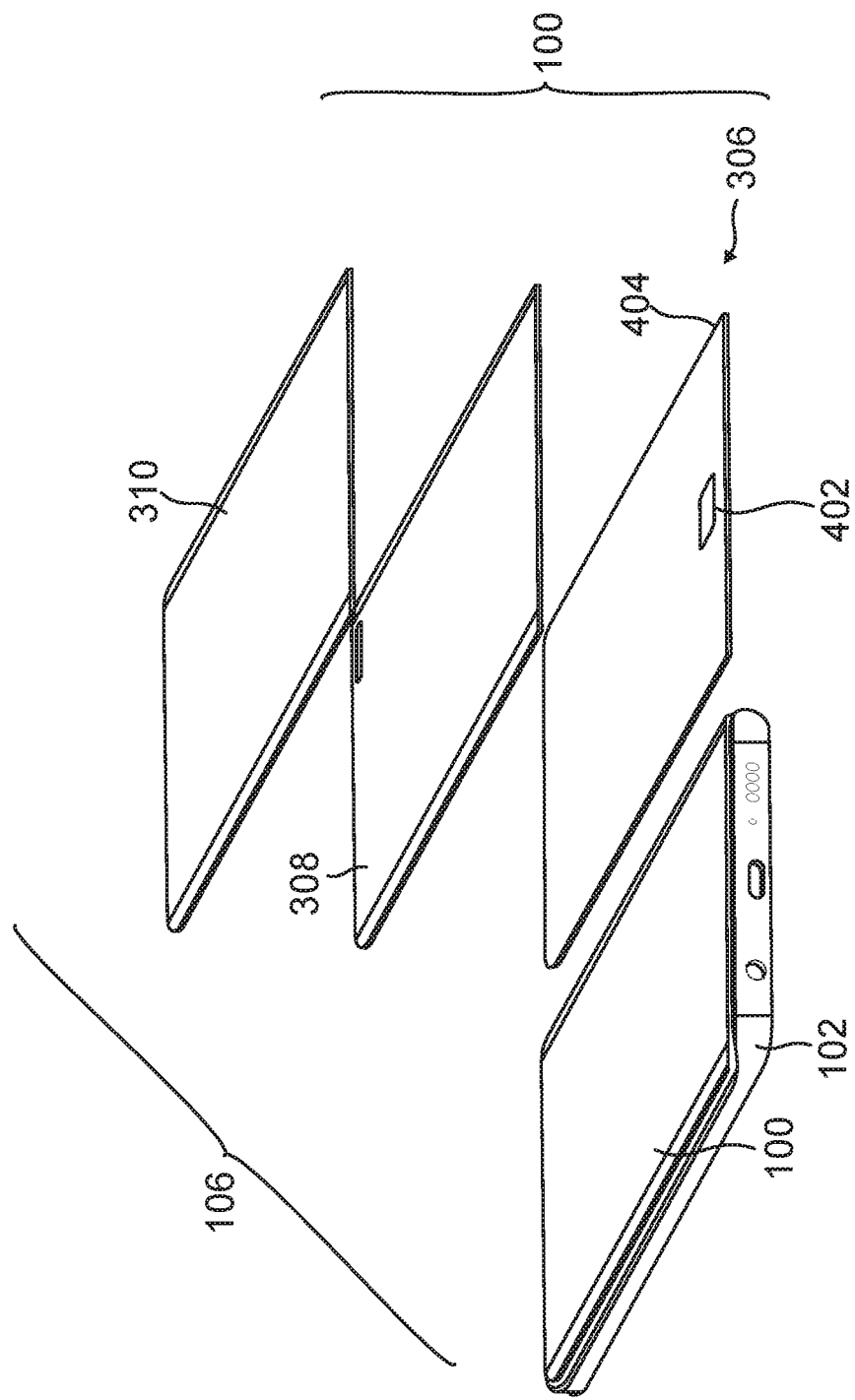
FIG. 5 is a diagram that illustrates an exploded view of the screen protector and the mobile device, according to various embodiments of the invention.

FIG. 5 illustrates an exploded view of the screen protector and the mobile device, according to various embodiments of the invention. More specifically, FIG. 5 illustrates the three layers 306-310 of the screen protector 100 and the mobile device 102. The top layer 310 may be made of glass and may be of any thickness. For example, in an embodiment, the top layer 310 may be 0.25 mm thick. In another embodiment, the top layer 310 may be between 0.15 and 0.35 mm thick. In another embodiment, the top layer 310 may be between 0.05 and 0.45 mm thick, or thicker.

The middle layer 308 may be made of an anti-explosive film that may be a combination of acrylic adhesive and optical grade polyethylene terephthalate (PET). The middle layer 308 may also include micro-particles and/or dots, but may not have micro-particles and/or dots at a portion of the middle layer 308 that may be above the fingerprint conduit 402. The materials that are used in the middle layer 308 may have certain thicknesses. For example, in an embodiment, the acrylic adhesive of the anti-explosive film may be 0.008 mm thick, and the optical grade PET of the anti-explosive film may be 0.0045 mm thick. In another example embodiment, the acrylic adhesive of the anti-explosive film may be between 0.002 mm and 0.018 mm thick, or thicker and the optical grade PET of the anti-explosive film may be between 0.028 mm and 0.048 mm thick, or thicker.

In some embodiments, the middle layer 308 includes an opening that may be aligned with the fingerprint conduit 402 of the bottom layer 306, such that the fingerprint conduit 402 directly contacts the top layer 310. Because the fingerprint conduit 402 directly contacts the top layer 310, any air gap between the mobile device screen and the screen protector that causes interference may be eliminated or minimized.

As discussed above, the screen protector 100 also includes three layers: the top layer 310, the middle layer 308, and the bottom layer 306. The screen protector 100 may use materials that are sufficiently transparent to accurately emit and detect sound waves (or other signals) used for fingerprint detection. For example, as discussed above, the top layer 310 may be a first layer made of a clear rigid material and configured to be touched by a user. The middle layer 308 may be a second layer beneath the first layer and made of a film. The bottom layer 306 may be a third layer beneath the second layer and configured to contact the mobile device. The third layer (bottom layer 306) may include a fingerprint conduit configured to facilitate the in-screen fingerprint detection. One or more of the clear rigid material, the film, and the fingerprint conduit may be sufficiently transparent to accurately emit and detect sound waves (or other signals) used for fingerprint detection.

The bottom layer 306 has a perimeter portion 404 and a fingerprint conduit 402. The perimeter portion 404 may be made of double-sided tape. The perimeter portion 404 may be a certain thickness. For example, in an embodiment the perimeter portion 404 may be 0.1 mm thick. In an embodiment the perimeter portion 404 may be between 0.05 mm and 0.15 mm thick, or thicker. The fingerprint conduit 402 may be double sided tape made of a first acrylic adhesive layer on top of an optical grade PET layer, which may be on top of a second acrylic adhesive layer. The first acrylic adhesive layer, the optical grade PET layer, and the second acrylic adhesive layer may have certain thicknesses. For example, in an embodiment, the first acrylic adhesive layer may be 0.005 mm thick, the optical grade PET layer may be 0.001 mm thick, and the second acrylic adhesive layer may be 0.005 mm thick, resulting in a fingerprint conduit 402 that may be 0.011 mm thick. The fingerprint conduit 402 may be sufficiently transparent to allow sound waves to pass through the fingerprint conduit 402 without interference. In another embodiment, the first acrylic adhesive layer may be between 0.0025 mm and 0.0075 mm thick, or thicker, the optical grade PET layer may be between 0.0005 mm and 0.0075 mm thick, or thicker and the second acrylic adhesive layer may be between 0.0025 mm and 0.0075 mm thick, or thicker. Generally, the thickness of the three layers: the top layer 310, the middle layer 308, and the bottom layer 306 may be made using materials that are not too thick to reliably perform the ultrasonic or other fingerprint detection.

Figure 6:
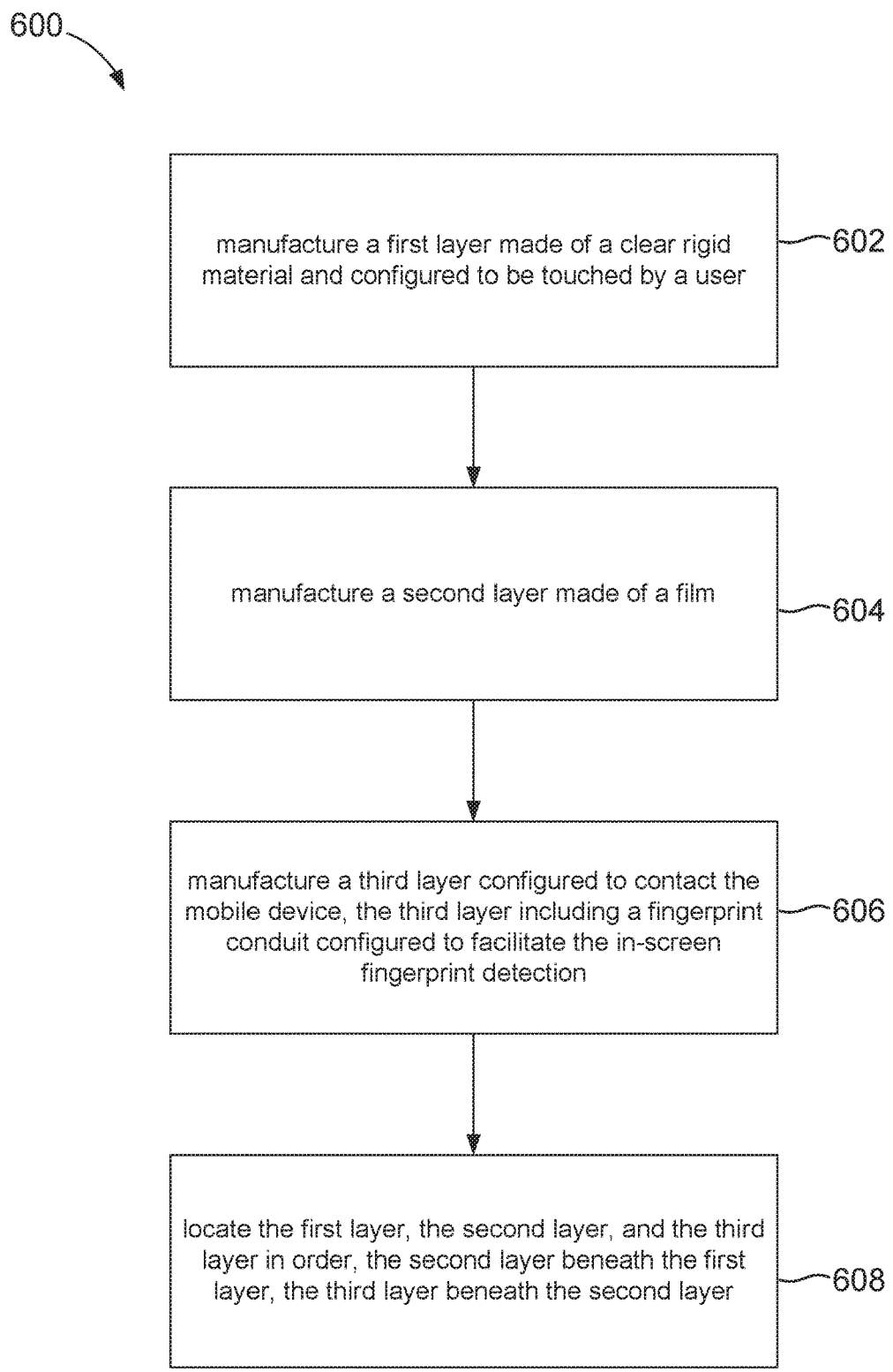
FIG. 6 is a flow diagram that illustrates an example method according to various embodiments of the invention.

FIG. 6 is a flow diagram that illustrates an example method 600 according to various embodiments of the invention. The method 600 includes manufacturing a first layer made of a clear rigid material and configured to be touched by a user (602). The method 600 also includes manufacturing a second layer made of a film (604). Additionally, method 600 includes manufacturing a third layer configured to contact the mobile device (606). The third layer including a fingerprint conduit configured to facilitate the in-screen fingerprint detection. The method 600 also includes locating the first layer, the second layer, and the third layer in order, the second layer beneath the first layer, the third layer beneath the second layer (608).

The method 600 includes manufacturing a first layer made of a clear rigid material and configured to be touched by a user (602). The top layer 310 may be a first layer made of a clear rigid material and configured to be touched by a user. Generally, the thickness of the top layer 310 may be made using materials that are not too thick to reliably perform the ultrasonic or other fingerprint detection.

The method 600 also includes manufacturing a second layer made of a film (604). The middle layer 308 may be a second layer beneath the first layer and made of a film. The film may be sufficiently transparent to accurately emit and detect sound waves (or other signals) used for fingerprint detection.

Additionally, method 600 includes manufacturing a third layer configured to contact the mobile device (606). The third layer including a fingerprint conduit configured to facilitate the in-screen fingerprint detection. The bottom layer 306 may be a third layer beneath the second layer and configured to contact the mobile device. The third layer (bottom layer 306) may include a fingerprint conduit configured to facilitate the in-screen fingerprint detection. The fingerprint conduit may be sufficiently transparent to accurately emit and detect sound waves (or other signals) used for fingerprint detection. The fingerprint conduit 402 may be double sided tape made of a first acrylic adhesive layer on top of an optical grade PET layer, which may be on top of a second acrylic adhesive layer.

The method 600 also includes locating the first layer, the second layer, and the third layer in order, the second layer beneath the first layer, the third layer beneath the second layer (608). Accordingly, the top layer 310, the middle layer 308, and the bottom layer 306 may be placed in the order top layer 310, middle layer 308, bottom layer 306. With the top layer 310 away from the screen 108 of a mobile device 102 and the bottom layer in contact with the screen 108 of the mobile device 102.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

While the principles of this disclosure have been shown in various embodiments, many modifications of structure, arrangements, proportions, the elements, materials and components, used in practice, which may be particularly adapted for a specific environment and operating requirements may be used without departing from the principles and scope of this disclosure. These and other changes or modifications are intended to be included within the scope of the present disclosure and may be expressed in the following claims.

An aspect may include a screen protector for a mobile device capable of an in screen fingerprint detection.

An aspect may include a first layer made of a clear rigid material and configured to be touched by a user.

An aspect may include a second layer beneath the first layer and made of a film.

An aspect may include a third layer beneath the second layer configured to contact the mobile device. The third layer may include a fingerprint conduit configured to facilitate the in-screen fingerprint detection.

In an aspect, the first layer may be made of glass.

In an aspect, the first layer may be 0.25 mm thick.

In an aspect, the film is made of a layer of acrylic adhesive and a layer of optical grade PET.

In an aspect, the layer of acrylic adhesive is 0.008 mm thick and the layer of optical grade PET is 0.0045 mm thick.

In an aspect, the third layer may further include a perimeter portion made of double-sided tape, located along a perimeter of the second layer, and configured to secure the screen protector to a screen of the mobile device.

In an aspect, the fingerprint conduit may be made of a first layer of double-sided tape, a layer of acrylic adhesive, and a second layer of double-sided tape.

In an aspect, the first layer of double-sided tape may be 0.005 mm thick, the layer of acrylic adhesive may be 0.001 mm thick, and the second layer of double-sided tape may be 0.005 mm thick.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, a thermal connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A screen protector for a mobile device capable of an in-screen fingerprint detection, the screen protector comprising:
   a first layer made of a clear material and configured to be touched by a user;
   a second layer beneath the first layer and made of a film; and
   a third layer beneath the second layer and configured to contact the mobile device, the third layer including a wave emitting portion, the wave emitting portion including a first acrylic adhesive layer, a first optical grade polyethylene terephthalate (PET) layer, and a second acrylic adhesive layer, the wave emitting portion configured to directly contact the first layer through an opening in the second layer, the wave emitting portion configured to facilitate the in-screen fingerprint detection.

2. The screen protector of claim 1, wherein the first layer is made of glass.

3. The screen protector of claim 2, wherein the first layer is 0.25 mm thick.

4. The screen protector of claim 1, wherein the film is made of a third acrylic adhesive layer and a second optical grade polyethylene terephthalate (PET) layer.

5. The screen protector of claim 4, wherein the third acrylic adhesive layer is 0.008 mm thick and the second optical grade polyethylene terephthalate (PET) layer is 0.0045 mm thick.

6. The screen protector of claim 1, wherein the third layer further includes a perimeter portion made of double-sided tape, located along a perimeter of the second layer, and configured to secure the screen protector to a screen of the mobile device.

7. The screen protector of claim 1, wherein the first acrylic adhesive layer is 0.005 mm thick, the first optical grade polyethylene terephthalate (PET) layer is 0.001 mm thick, and the second acrylic adhesive layer is 0.005 mm thick.

8. A mobile device system capable of an in-screen fingerprint detection, the mobile device system comprising:
   a mobile device having a screen, the screen having a fingerprint detection region; and
   a screen protector including:
      a first layer made of a clear material and configured to be touched by a user;
      a second layer beneath the first layer and made of a film; and
      a third layer beneath the second layer and configured to contact the mobile device, the third layer including a fingerprint conducting layer, the fingerprint conducting layer including a first acrylic adhesive layer, a first optical grade polyethylene terephthalate (PET) layer, and a second acrylic adhesive layer, the fingerprint conducting layer configured to directly contact the first layer through an opening in the second layer, the fingerprint conducting layer configured to facilitate the in-screen fingerprint detection.

9. The mobile device system of claim 8, wherein the first layer of the screen protector is made of glass.

10. The mobile device system of claim 9, wherein the first layer of the screen protector is 0.25 mm thick.

11. The mobile device system of claim 8, wherein the film of the screen protector is made of a third acrylic adhesive layer and a second optical grade polyethylene terephthalate (PET) layer.

12. The mobile device system of claim 11, wherein the third acrylic adhesive layer of the screen protector is 0.008 mm thick and the second optical grade polyethylene terephthalate (PET) layer of the screen protector is 0.0045 mm thick.

13. The mobile device system of claim 8, wherein the third layer of the screen protector further includes a perimeter portion made of double-sided tape, located along a perimeter of the second layer, and configured to secure the screen protector to the screen of the mobile device.

14. The mobile device system of claim 8, wherein the first acrylic adhesive layer is 0.005 mm thick, the first optical grade polyethylene terephthalate (PET) layer is 0.001 mm thick, and the second acrylic adhesive layer is 0.005 mm thick.

15. A method of making a screen protector for a mobile device capable of an in-screen fingerprint detection, the method comprising:

manufacturing a first layer made of a clear material and configured to be touched by a user;

manufacturing a second layer made of a film;

manufacturing a third layer configured to contact the mobile device, the third layer including a fingerprint conducting layer, the fingerprint conducting layer including a first acrylic adhesive layer, a first optical grade polyethylene terephthalate (PET) layer, and a second acrylic adhesive layer, the fingerprint conducting layer configured to directly contact the first layer through an opening in the second layer, the fingerprint conducting layer configured to facilitate the in-screen fingerprint detection; and locating the first layer, the second layer, and the third layer in order, the second layer beneath the first layer, the third layer beneath the second layer.

16. The method of claim 15, wherein the first layer is made of glass.

17. The method of claim 15, wherein the film is made of a third acrylic adhesive layer and a second optical grade polyethylene terephthalate (PET) layer.

18. The method of claim 15, wherein the third layer further includes a perimeter portion made of double-sided tape, located along a perimeter of the second layer, and configured to secure the screen protector to a screen of the mobile device.

* * * * *